July 5, 1966  R. W. RUSSELL  3,259,863
WINDING ARRANGEMENT FOR CORE TYPE TRANSFORMER
Filed Nov. 26, 1963  2 Sheets-Sheet 1
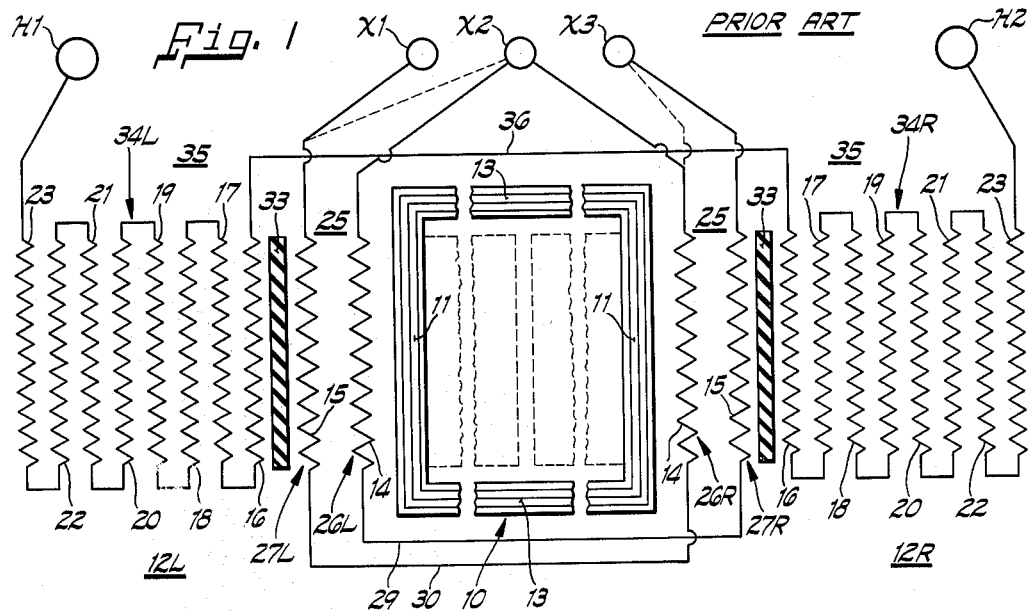
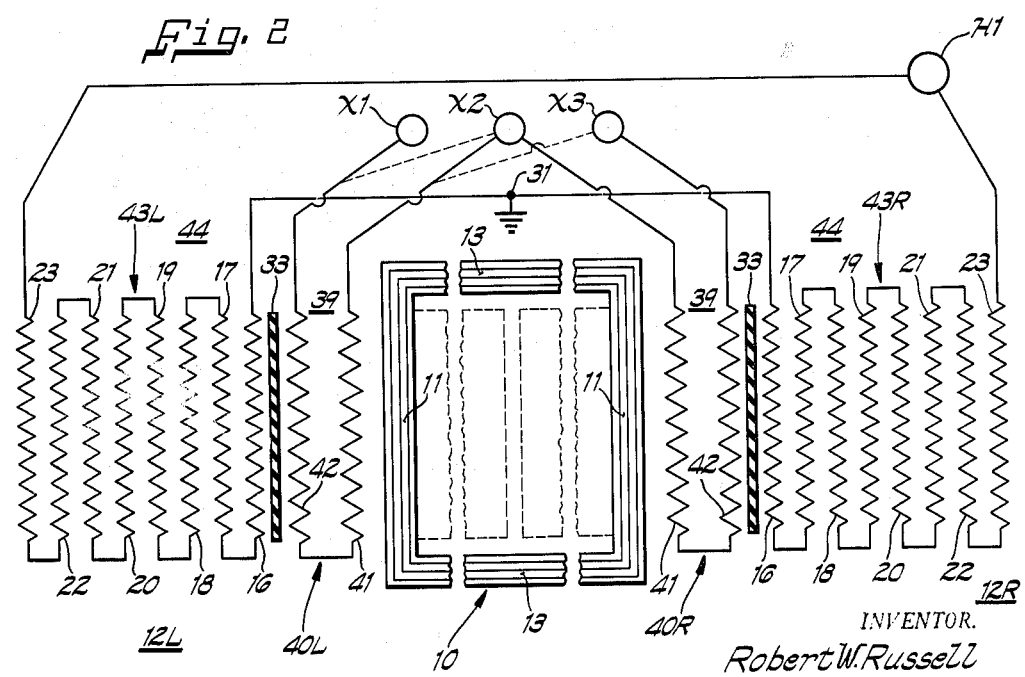
INVENTOR.
Robert W. Russell
BY Lee H. Kaiser
Attorney

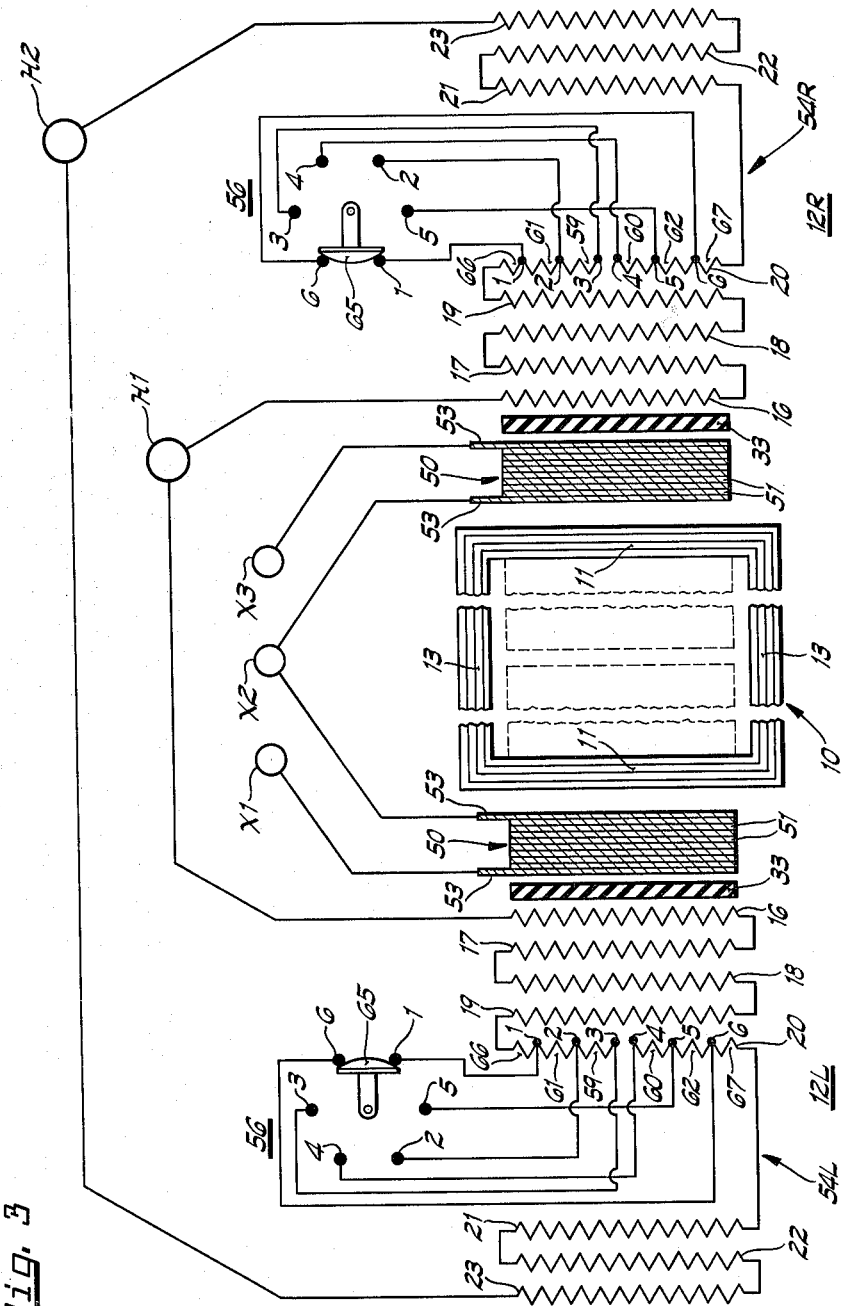

United States Patent Office 3,259,863
Patented July 5, 1966

3,259,863
WINDING ARRANGEMENT FOR CORE TYPE
TRANSFORMER
Robert W. Russell, New Concord, Ohio, assignor to Mc-Graw-Edison Company, Milwaukee, Wis., a corporation of Delaware
Filed Nov. 26, 1963, Ser. No. 326,126
7 Claims. (Cl. 336—182)

This invention relates to stationary induction apparatus and particularly to winding arrangements for core type electrical distribution transformers.

Distribution transformers are conventionally provided with a pair of secondary windings which may be connected in series for 240 volt service or in parallel for 120 volt service. In a core type distribution transformer having a coil on each winding leg of the magnetic core, the transformer primary winding conventionally comprises a pair of series connected high voltage winding sections one of which is in each coil and is separated by a tubular insulating barrier from the transformer secondary winding which is conventionally constructed with an inner and an outer low voltage winding section in each coil and crossover conductors connecting the inner low voltage winding section in one coil with the outer low voltage winding section in the other coil. For example, two 60 volt secondary winding sections may be wound on each core leg, and the inner 60 volt section on one leg is joined by a crossover conductor to the outer 60 volt section on the other leg to provide one half of the 120/240 volt secondary, and the remaining two 60 volt sections are connected by a crossover conductor to provide the other half of the low voltage, or secondary, winding. The four 60 volt secondary winding sections are connected in series for 240 volt service, or the two serial arrangements of 60 volt windings may be connected in parallel to provide full kva. rating at 120 volts. This arrangement of four low voltage winding sections connected by crossover conductors requires considerable labor and is costly to construct, particularly with aluminum or copper strip secondaries because of the difficulty of connecting terminals to the metallic strip. Further, such winding arrangement requires a high-to-low insulation barrier in each coil between the low voltage and high voltage winding sections of sufficient dielectric strength to withstand the impulse voltage required by industry standards for transformers of the primary voltage class. Still further, when the transformer is supplying two separate 120 volt loads and one 120 volt arrangement of secondary winding sections is accidentally short circuited, fault current at extremely high magnitude flows in the shorted secondary winding section and results in severe heating and the generation of extremely high mechanical forces tending to displace the conductor turns of the secondary winding.

It is an object of the invention to provide a winding arrangement for a core type distribution transformer which obviates the need for crossover conductors and substantially reduces the cost and the amount of time required to construct the low voltage winding. A further object of the invention is to provide such a winding arrangement which substantially reduces the potential fault current when the low voltage winding sections supply separate loads. Another object of the invention is to provide such a winding arrangement wherein the copper loss and stray loss are materially reduced in comparison to prior art construction. An object of one embodiment of the invention is to provide such a winding arrangement which permits a substantial reduction in the required impulse strength of the high-to-low insulating barrier. Still another object of this embodiment of the invention is to provide such a winding arrangement which materially reduces the reactance of the transformer.

These and other objects and advantages of the invention will be more readily apparent from the following detailed description when taken in conjunction with the accompanying drawing wherein:

FIG. 1 is a schematic circuit diagram of the conventional prior art winding arrangement for a core type distrbiution transformer;

FIG. 2 is a schematic circuit diagram of a preferred embodiment of winding arrangement in accordance with the invention for a single bushing, core type distribution transformer; and FIG. 3 is a schematic circuit diagram of an alternative embodiment of the invention for a two bushing, core type distribution transformer provided with tap changers.

Referring to the drawing, the invention will be illustrated and described with reference to a schematic circuit diagram of a core type distribution transformer having a closed magnetic core 10 provided with a pair of straight winding legs 11 surrounded by cylindrical coils 12 and connected by yokes 13. The word "cylindrical" is used throughout the description and in the appended claims to connote a surface traced by a straight line moving parallel to a fixed straight line and thus covering coils of circular, rectangular, D-shaped, or oval cross section. The two coils 12L and 12R on the left and right winding legs as seen in the drawing are identical and each coil 12L and 12R as illustrated comprises a plurality of concentric cylindrical layers 14–23 of conductor turns surrounding winding leg 11. In order to simplify the drawing and facilitate the understanding of the invention, the cylindrical configuration of the turns and the layers is omitted from the drawing, the conductor turns are omitted from both sides of the core leg as would be seen in a cross sectional view through the coils, and each cylindrical layer of conductor turns is represented by the electrical symbol for a winding.

In the conventional prior art construction illustrated in FIG. 1, the transformer low voltage winding 25 comprises a 60 volt, inner, low voltage winding section 26 of helically wound conductor turns in the radially innermost layer 14 in both coils 12L and 12R and a 60 volt, outer, low voltage section 27 in the next radially adjacent layer 15 in each coil 12L and 12R with the inner winding section 26 in one coil, e.g., section 26L, connected at one end to a low voltage insulating bushing X2 and connected at the opposite end by a crossover conductor 29 to one end of the outer winding section 27R in the other coil 12R and which is connected at its other end to the secondary insulating bushing X3, and also with the inner winding section 26R in the right coil 12R connected at one end to the bushing X2 and connected at its other end by a crossover conductor 30 to the outer winding section 27L which is connected at its upper end to the insulating bushing X1. The low voltage winding sections 26 and 27 in each coil 12L and 12R are surrounded by a cylindrical, or tubular, high-to-low insulating barrier 33 which isolates them from the primary, or high voltage, winding section 34 which occupies the radially outer portion of the coil. The high voltage winding 35 of such a conventional prior art transformer of 7200—120/240 volt rating may comprise a high voltage winding section 34 in each of the coils 12L and 12R wound of eight radially successive layers 16, 17, 18, 19, 20, 21, 22 and 23 of helical conductor turns with the turns in successive layers wound in opposite directions along core leg 11 and with the high voltage sections 34 in the two coils 12L and 12R connected in series by a conductor 36 and with one end of the high voltage sections 34L and 34R in the coils 12L and 12R connected to the primary insulating bushings H2 and H1 respectively.

It will be appreciated that two low voltage sections 27L and 26R are connected in series for a 120 volt load available between secondary bushings X1 and X2 and that sections 26L and 27R are connected in series for a 120 volt load available between X2 and X3, and that the four low voltage sections 27L, 26R, 26L and 27R are connected in series for 240 volt service available between secondary bushings X1 and X3. It is also conventional to connect the two serial arrangements of 60 volt sections 27L–26R and 26L–27R in parallel for 120 volt service at full kva. rating across secondary bushings X2 and X3 by connecting one end of low voltage winding section 27L in left coil 12L to bushing X2 and one end of winding section 26R to secondary bushing X3 as shown in dotted lines in FIG. 1.

With such prior art arrangement of two high voltage winding sections 34L and 34R in the two coils 12L and 12R connected in series, it was impossible to wind a 120 volt low voltage winding section in each coil 12L and 12R since severe unbalance forces result unless both such 120 volt section carry load currents of approximately equal magnitude. If a load were connected to one such low voltage winding section disposed in one coil only, for example, in left coil 12L, primary current would increase in the primary winding section 34L in the left coil to maintain the primary coil flux at the original value, and such primary current would also flow in the primary winding section 34R in the right coil 12R and result in severe electrical unbalance since (it has been assumed) the 120 volt section in the right coil 34R was not connected to a load.

In the winding arrangement embodying the invention, each coil 12L and 12R is independent of the other with respect to 120 volt loading, and the unbalance forces are not severe if one 120 volt winding section carries load current and the other does not.

The transformer low voltage winding 39 of the single bushing core type distribution transformer embodying the invention illustrated in FIG. 2 comprises a pair of low voltage winding sections 40L and 40R each of which is in the radially innermost portion of one of the coils 12. Each low voltage winding section 40L and 40R preferably comprises an innermost layer 41 of helical conductor turns wound, or progressing, in one axial direction down core leg 11 and the next radially outer layer 42 of helical conductor turns wound, or progressing, in the opposite axial direction up core leg 11 so that the "start" turn and the "finish" turn are at the same end of coil 11. In other words, low voltage winding section 40 is preferably wound down and back on core leg 11. The "start" turn of both low voltage winding sections 40L and 40R may be connected to the secondary insulating bushing X2, and the "finish" turns of the low voltage sections 40L and 40R in the left and right coils 12L and 12R may be connected to the secondary insulating bushings X1 and X3 respectively.

Transformer secondary winding section 40 is surrounded by a cylindrical, or tubular, high-to-low insulating barrier 33 that isolates it from the primary winding section 43 which occupies the radially outer portion of the coil 12. The primary winding sections 43L and 43R in the two coils 12L and 12R constitute the transformer high voltage winding 44. Each primary winding section 43 includes the radially inner layer 16 of conductor turns adjacent the barrier 33 and preferably having the "start" turn at the same end of the coil 12 as the "start" and "finish" turns of secondary winding section 40. Primary winding section 43 also includes seven additional radially successive concentric layers 17–23 of helical conductor turns continuous with the wire of layer 16 and having the helical turns in successive layers wound, or progressing, in opposite directions axially of core winding leg 11. Each primary winding section 43L and 43R may thus comprise eight layers 16–23 of helically wound wire with suitable insulation such as kraft paper (not shown) between layers to form a high potential, e.g., 7200 volt, winding section. The "finish" turn in layer 23 is preferably at the same end of coil 12 as the "start" turn in layer 16.

The primary winding sections 43L and 43R of the two coils 12L and 12R are preferably wound in opposite directions on the core legs 11, and the oppositely wound primary winding sections 43L and 43R are connected in parallel to constitute the transformer high voltage winding 44. The "start" turns of both primary winding sections 43L and 43R are grounded at 31, and the "finish" turn of the primary winding sections 43 in both coils 12L and 12R is connected to the single primary insulating bushing H1 of the transformer.

It will be appreciated that no crossover conductors are required between the coils 12L and 12R in the arrangement of FIG. 2, and that the secondary winding sections 40L and 40R having "start" and "finish" turns at the same end of the coil may serve 120 volt loads connected between bushings X1 and X2 and between X2 and X3; that they may be operated in parallel to supply a 120 volt load at full kva., for example, if low voltage winding section 40L were connected across bushings X2 and X3 as shown in dotted lines; or that they may be connected in series to supply 240 volt service connected across secondary bushings X1 and X3. The elimination of crossover conductors between low voltage winding sections 40L and 40R substantially reduces the stray loss for the transformer. Inasmuch as the "start" turns of the primary winding sections 43L and 43R are grounded, the potential difference between the high voltage winding section layer of conductor turns 16 adjacent the barrier 33 and the low winding section 40 is substantially reduced in comparison to prior art construction, and consequently the impulse dielectric strength and the thickness of the high-to-low barrier 33 is materially lessened in comparison to prior art arrangements. The reduction in the thickness of the barrier 33 decreases the leakage flux and results in lowering of the reactance of the transformer. The disclosed construction also reduces the low voltage fault current which flows when the low voltage sections 40L and 40R in the two coils 12 are not connected in parallel but rather serve separate loads and one of the low voltage sections 40L or 40R is short circuited. Inasmuch as there are no crossover conductors between coils 12L and 12R and the low voltage winding sections 40L and 40R are not connected in parallel, each coil 12 may be considered to be a separate core and coil assembly having one-half the kva. of the distribution transformer. For example, in a 25 kva. transformer, each coil 12L and 12R may be considered to be a 12½ kva. transformer when calculating fault currents if the low voltage winding sections 40 are serving separate loads. In contrast, in conventional units having primary winding sections in the two coils connected in series and crossover conductors between the low voltage winding sections in the coils 12L and 12R, the full 25 kva. is available to generate fault current in a low voltage winding section when the transformer is supplying separate 120 volt loads and this 120 volt section is accidentally shorted.

A 25 kva. two percent impedance transformer of the prior art type illustrated in FIG. 1 has a potential fault current of approximately 5000 amperes when the two serial arrangements of low voltage winding sections 27L–26R and 26L–27R are connected in series to provide 240 volt service between bushings X1 and X3. The potential fault current is approximately 10,000 amperes when they are connected in parallel as shown in dotted lines in FIG. 1 to supply 120 volt service at rated kva. between bushings X2 and X3. The current density in any part of the low voltage winding sections will not exceed approximately 5000 amperes. If the low voltage windings serve separate loads connected between X1 and X2 and between X2 and X3 as shown in full lines in FIG. 1, the impedance increases to approximately 2.4 percent since the resistance is now twice that which existed when the windings were in parallel. If one serial arrangement 27L–26R or 26L–

27R is now short circuited, a fault current of approximately 8500 amperes flows in the active part of the winding. This causes severe heating and the generation of extremely high mechanical forces tending to relatively displace the high and low voltage winding sections of such prior art construction.

The short circuit current in the arrangement of FIG. 2 is substantially the same regardless of whether the low voltage coil sections 40L and 40R are serving separate loads connected across bushings X1–X2 and X2–X3; whether they are supplying 240 volt service across bushings X1–X3; or whether they are connected in parallel to supply 120 volt service at full kva. Each coil 12 and each low voltage winding section is substantially independent of the other. When supplying 240 volt service across bushings X1 and X3, the low voltage short circuit current is limited by the impedance of the two winding sections 40L and 40R in series in a manner analogous to the prior art arrangement of FIG. 1. However, a considerable reduction in potential fault current is accomplished by the invention illustrated in FIG. 2, in comparison to the prior art, when the low voltage sections 40L and 40R are supplying separate loads across X1–X2 and across X2–X3 respectively. Each low voltage section 40 constitutes an entire short circuit path within one coil 12 and is closely coupled to the primary winding section 43 of that coil and is relatively loosely coupled to the primary winding section of the other coil 12, in comparison to the prior art arrangement of FIG. 1 wherein each low voltage winding section includes one layer 26 or 27 closely coupled to the primary winding section of the left coil 12L in series with a low voltage winding layer 26 or 27 closely coupled to the primary winding section of the right coil 12R. Thus, in the prior art, the only change of impedance, when transferring from paralleled secondary winding sections to individual loads energized from separate winding sections, was the doubling of the resistance component. In contrast, not only is the resistance component of the impedance doubled when winding section 40L and 40R of the embodiment of FIG. 2 serve separate loads in comparison to parallel operation thereof, but also the mutual inductance is materially reduced between the faulted secondary section 40L or 40R and the primary winding of the other coil, for example, the mutual inductance between winding sections 40L and 43R is substantially reduced. Consequently, the potential fault current in a transformer embodying the invention is reduced, when the secondary winding sections 40L and 40R are serving separate loads, to a magnitude approximately equal to the fault current when the windings 40L and 40R are in parallel. In calculating short circuit current, each coil 12L and 12R may be considered as a separate transformer having one-half the kva. rating of the transformer.

FIG. 3 illustrates the invention as embodied in a two bushing, core type distribution transformer with a strip wound secondary wherein each low voltage winding section 50 comprises a plurality of spirally wound layers 51 of conductor strip having a width approximately equal to the axial length of coil 12. For example, each low voltage winding section 50 may comprise ten turns 51 (schematically illustrated in cross section) of aluminum or copper strip extending across the entire height of coil 12 in surrounding relation to core leg 11 and having axially extending "start" and "finish" terminals 53 protruding from the same end of coil 12. The "finish" turns of the high voltage winding sections 54L and 54R in the two coils 12L and 12R are connected to a primary insulating bushing H1 in the same manner as in the preferred embodiment, but the "start" turns of primary winding sections 54L and 54R are not grounded as in the construction of FIG. 2 but rather are connected to a second primary insulating bushing H2. The high-to-low insulating barriers 33 in the coils 12L and 12R of the embodiment of FIG. 3 are of sufficient radial thickness and dielectric strength to withstand the full impulse voltage specified by industry standards for transformers of the primary voltage rating.

A plurality of taps are provided in the high voltage winding section 54 of both coils 12, separate tap changers 56 are provided for each coil 12, and the two tap changers 56 are always operated in the same tap position. The tap sections are positioned so that the electrical center of the high voltage winding section 54 is substantially coincident with the physical center of coil 12 and, consequently, the mechanical forces tending to cause relative axial displacement between primary and secondary windings are a minimum as disclosed in my copending application Serial No. 240,271, filed November 27, 1962, entitled Balanced Electrical Winding Provided With Taps and having the same assignee as the present invention. Four tap sections 59–62 may be disposed in the fifth layer 20 in a radially outward direction of the high voltage winding section 54. The first tap section 59 is between taps 3 and 2 and comprises a plurality of conductor turns in layer 20 with the "start" turn positioned at the center of the layer 20 and connected to tap 3 and the succeeding turns wound in an upward direction on winding leg 11 and the "finish" turn connected to tap 2. The second tap section 60 is between taps 4 and 5 and comprises a plurality of conductor turns in layer 20 with the "start" turn positioned in the center of the layer 20 and connected to tap 4 but spaced from the "start" turn of the first tap section 59 and the succeeding turns wound down winding leg 11 and the "finish" turn connected to tap 5. The third tap section 61 is between taps 2 and 1 and comprises a plurality of conductor turns disposed axially above the first tap section 59 in layer 20 with the "start" turn connected to tap 2 and the succeeding turns wound up core leg 11 and the "finish" turn connected to tap 1. The fourth tap section 62 is between taps 5 and 6 and comprises a plurality of conductor turns axially disposed below the second tap section 60 in layer 20 with the "start" turn connected to tap 5 and the succeeding turns wound down core leg 11 and the "finish" turn connected to tap 6.

In the "neutral" tap changer position, the movable contact 65 of tap changer 56 electrically connects taps 3 and 4, and the movable contact may sequentially short-circuit between taps 4 and 2, 2 and 5, 5 and 1, and 1 and 6 to sequentially remove the first, second, third, and fourth tap sections 59, 60, 61 and 62 respectively from the circuit. In the "neutral" tap changer position, the first tap section 59 is electrically balanced by the second tap section 60 which is symmetrically disposed on the opposite side of the physical center of coil 12 from tap section 59, and similarly the third tap section 61 is electrically balanced by the fourth tap section 62. The conductor turns 66 of high voltage winding section 54 which fill up the space in layer 20 axially above the third tap section 61 are symmetrically disposed relative to, and on the opposite side of the physical center of coil 12 from, the conductor turns 67 which fill up the space in layer 20 axially below the fourth tap section 62 so that the conductor turns 66 electrically balance the conductor turns 67. Consequently, the electrical center of winding section 54 coincides with the physical center of coil 12 when the movable contact 65 of tap changer 38 is in the "neutral" position and also when it short circuits taps 2 and 5 to remove the first and second tap sections 59 and 60 from the circuit. When the movable contact 65 short circuits tap changer contacts 2 and 4 to remove the first tap section 59, and also when it electrically connects tap changer contacts 1 and 5 to inactivate the first, second, and third tap sections 59, 60 and 61, a single tap section disposed to one side of the physical center of the coil 12 is energized while the balancing tap section is denergized, but the unbalance forces tending to relatively displace the primary and secondary windings are still less than half those encountered with conventional construction. Further, the mechanical forces tending to displace the primary and secondary windings relative to each other in an axial direction are greatly reduced in comparison to conventional construction because the transformer primary current divides between the two paralleled high voltage winding sections 54L and 54R so that the ampere turns of electrical unbalance when a tap section is removed from the circuit is approximately one half that of a conventional transformer.

In transformers constructed in accordance with the embodiment of the invention illustrated in FIG. 3, the copper losses are significantly reduced in comparison to conventional construction. This reduction in copper losses may principally be accounted for by the elimination of the crossover conductors, and in one 250 kva. transformer constructed in accordance with FIG. 3 the copper losses were reduced to 2150 watts from the average value of 2400 watts in known core type transformers of this rating.

While only a few embodiments of the invention have been illustrated and described, many modifications and variations thereof will be apparent to those skilled in the art, and consequently it is intended in the appended claims to cover all such modifications and variations which fall within the true spirit and scope of the invention.

I claim:

1. In a step-down core type electrical power distribution transformer operated at power frequency, in combination, a closed magnetic core having a pair of winding legs, a cylindrical electrical coil surrounding each winding leg, each coil including a low voltage winding section, a high voltage winding section surrounding and having a substantially greater number of turns than and being inductively linked with said low voltage winding section, and a cylindrical insulating barrier disposed between said low and high voltage winding sections, said high voltage winding sections of said two coils being connected in parallel and wound in opposite directions.

2. A step-down core type electrical power distribution transformer operated at power frequency comprising, in combination, a closed magnetic core having a pair of winding legs, a cylindrical electrical coil surrounding each winding leg, each coil including a radially inner low voltage winding section, a radially outer high voltage winding section having a substantially greater number of turns than said low voltage winding section, and a cylindrical insulating barrier disposed between said low and high voltage winding sections, said low voltage winding section including a plurality of conductor turns surrounding said winding leg, said high voltage winding section including a plurality of concentric layers of helical conductor turns with successive layers in a radially outward direction wound in opposite directions, said high voltage winding sections of said two electrical coils being connected in parallel and wound in opposite directions.

3. In a transformer in accordance with claim 2 wherein said low voltage winding section comprises a plurality of spirally wound layers of strip conductor having a width approximately equal to the axial length of said coil.

4. In a transformer in accordance with claim 1 wherein the start and finish conductor turns of said low voltage winding section are at the same end of said coil.

5. A step-down core type electrical power distribution transformer for operation at power frequency comprising, in combination, a closed magnetic core having a pair of winding legs, a cylindrical electrical coil surrounding each winding leg, each coil including a radially inner low voltage winding section, a radially outer high voltage winding section having a substantially greater number of turns than said low voltage winding section, and a cylindrical insulating barrier disposed between said low and high voltage winding sections, said low voltage winding section including a pair of adjacent concentric helical layers of conductor turns advancing in opposite directions on said winding leg and starting and finishing at the same end of said coil, said high voltage winding section including a plurality of concentric layers of helical conductor turns with successive layers in a radially outward direction progressing in opposite directions, said high voltage winding sections of said two electrical coils being connected in parallel and wound in opposite directions and the starts of said two paralleled high voltage winding sections being adjacent said insulating barriers and grounded, whereby the dielectric strength of said barrier may be substantially decreased and the fault current when one of said low voltage winding sections is short circuited is reduced.

6. In a step-down core type electrical power distribution transformer operated at power frequency, a closed magnetic core having a pair of winding legs, a cylindrical electrical coil surrounding each of said winding legs, each said coil including a radially inner and a radially outer winding section and a tubular insulating barrier disposed therebetween, the radially inner of said winding sections comprising part of the low voltage winding of said transformer and including a plurality of layers of conductor turns and having the start and finish thereof at the same end of said coil, whereby said low voltage winding sections are adapted to be connected in series or parallel, the radially outer of said winding sections comprising part of the high voltage winding of said transformer and including a plurality of concentric layers of helical conductor turns with radially successive layers wound in opposite directions and having a substantially greater number of turns than said radially inner low voltage sections and having the starts thereof disposed adjacent said insulating barriers and grounded, said radially outer high voltage winding sections of said pair of coils being connected in parallel and wound in opposite directions.

7. In a core type electrical transformer in accordance with claim 6 wherein said radially inner low voltage winding section includes a pair of adjacent concentric layers of helical conductor turns which progress in opposite axial directions on said winding leg.

References Cited by the Examiner

UNITED STATES PATENTS 2,479,334   8/1949   Forbes et al. _____ 336—182 X

FOREIGN PATENTS 210,648   10/1957   Australia.
411,473   6/1934   Great Britain.

LARAMIE E. ASKIN, *Primary Examiner.*

ROBERT K. SCHAEFER, *Examiner.*

C. TORRES, *Assistant Examiner.*